May 19, 1970  E. D. PHILLIPS  3,512,306

GLASS THREADING APPARATUS

Filed July 18, 1967  6 Sheets-Sheet 1

INVENTOR
EDWIN D. PHILLIPS

BY Shoemaker and Mattare
ATTORNEYS

May 19, 1970   E. D. PHILLIPS   3,512,306
GLASS THREADING APPARATUS
Filed July 18, 1967   6 Sheets-Sheet 2
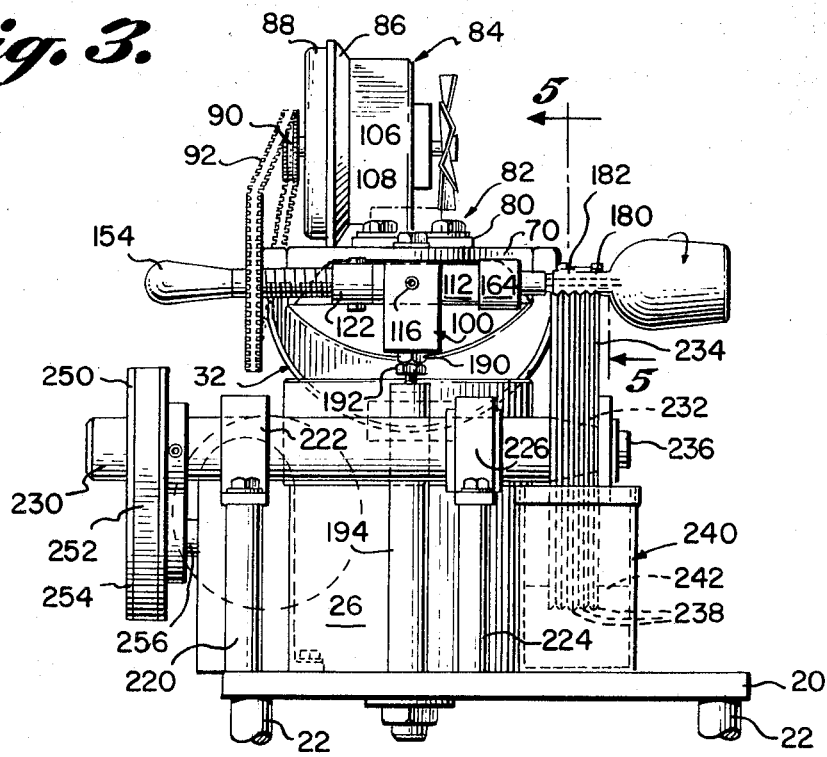
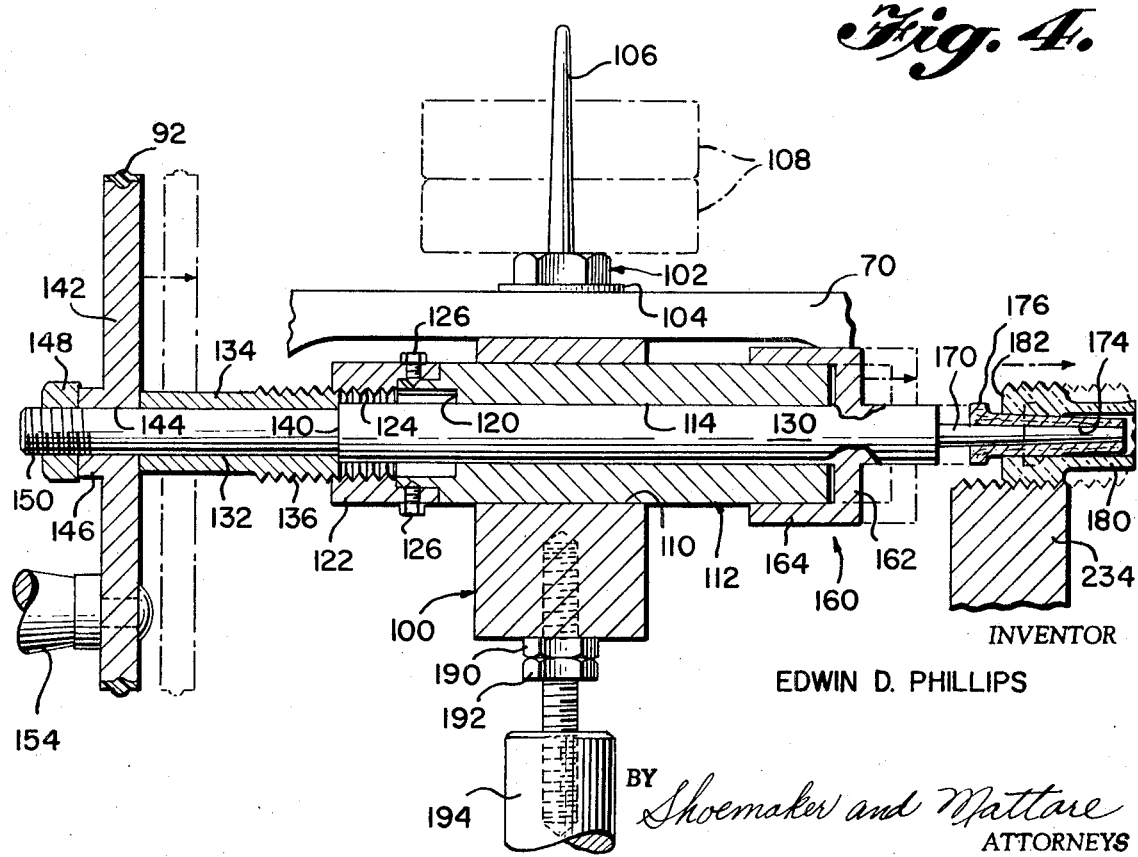
INVENTOR
EDWIN D. PHILLIPS
BY Shoemaker and Mattare
ATTORNEYS

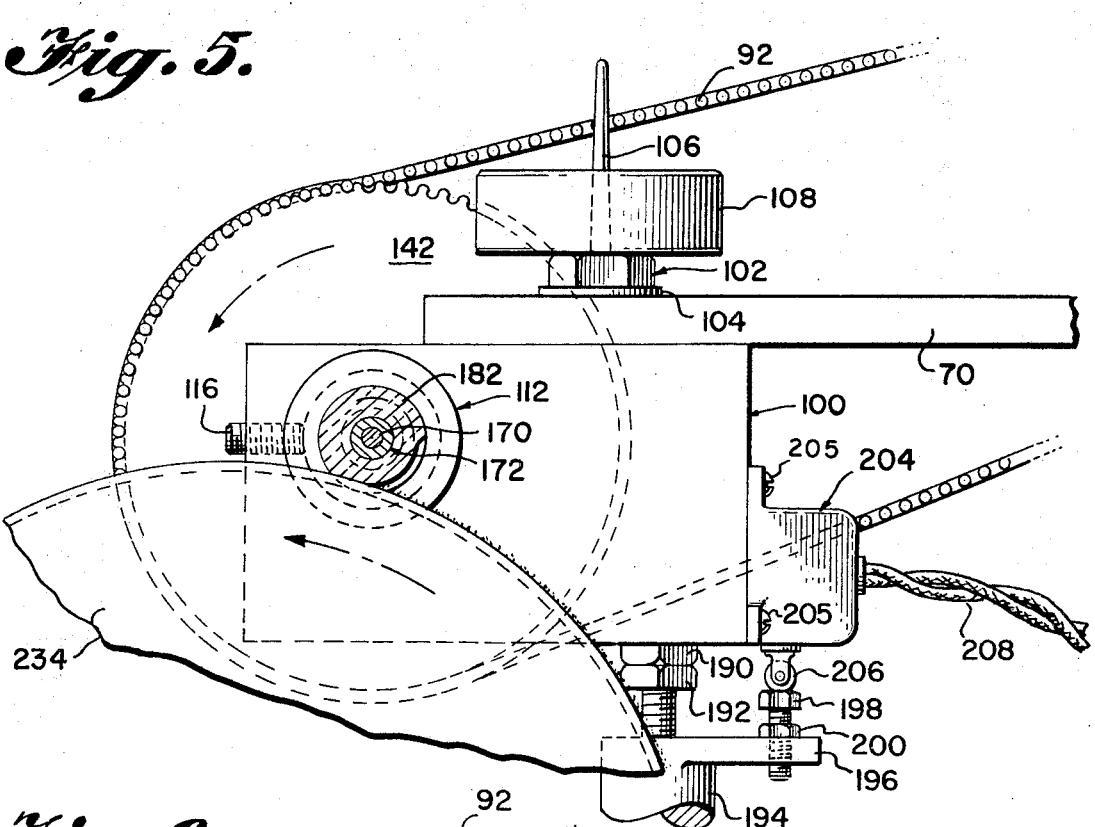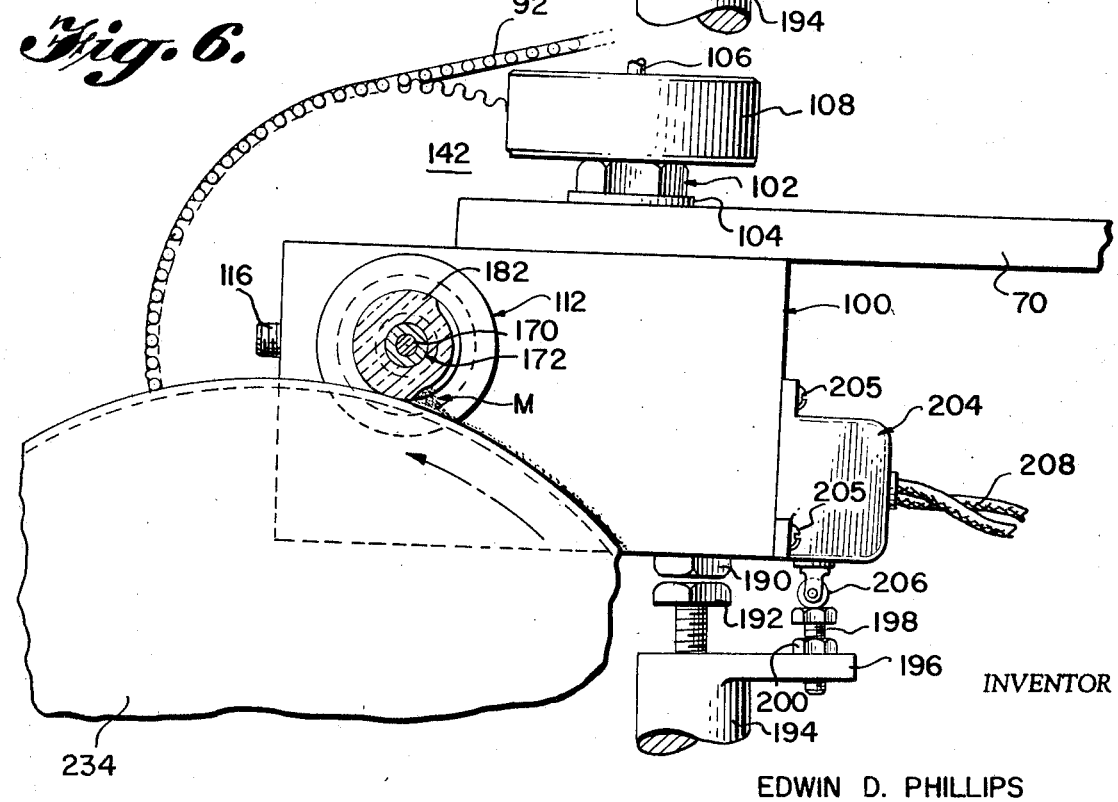

May 19, 1970  E. D. PHILLIPS  3,512,306
GLASS THREADING APPARATUS
Filed July 18, 1967  6 Sheets-Sheet 4
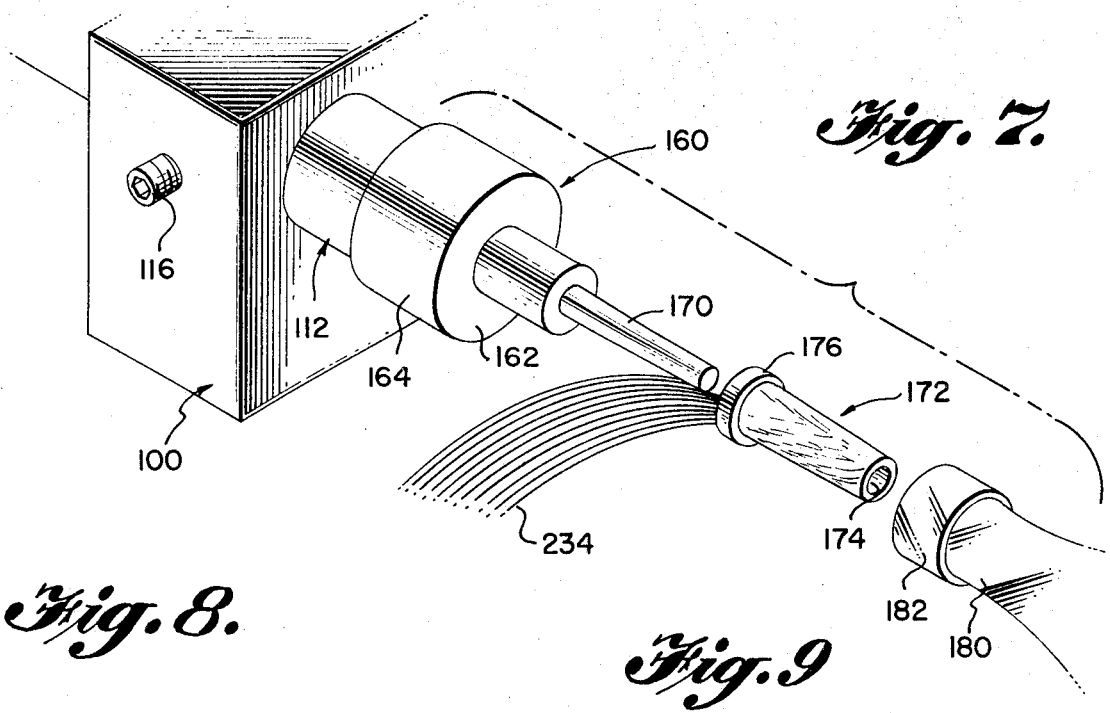
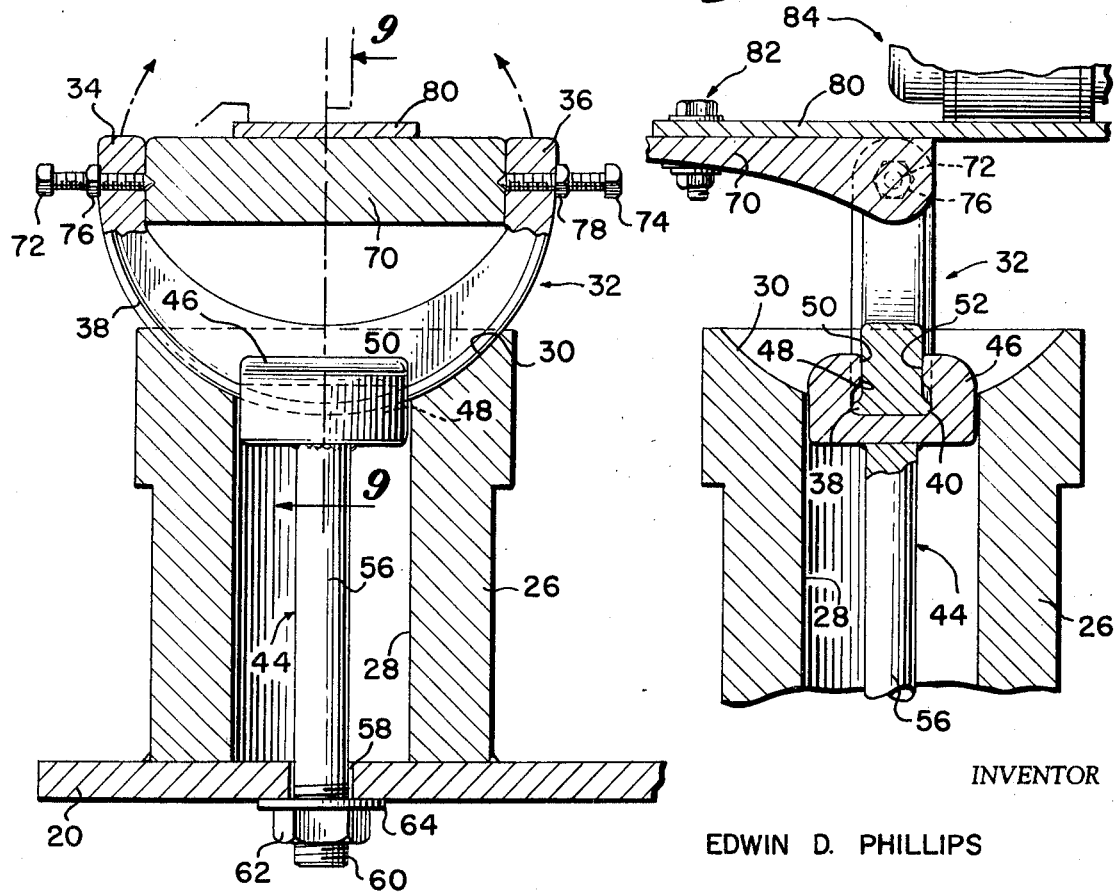
INVENTOR
EDWIN D. PHILLIPS
BY *Shoemaker and Mattare*
ATTORNEYS May 19, 1970

E. D. PHILLIPS 3,512,306

GLASS THREADING APPARATUS

Filed July 18, 1967

INVENTOR

EDWIN D. PHILLIPS

BY *Shoemaker and Mattare*

ATTORNEYS

May 19, 1970  E. D. PHILLIPS  3,512,306
GLASS THREADING APPARATUS
Filed July 18, 1967  6 Sheets-Sheet 6
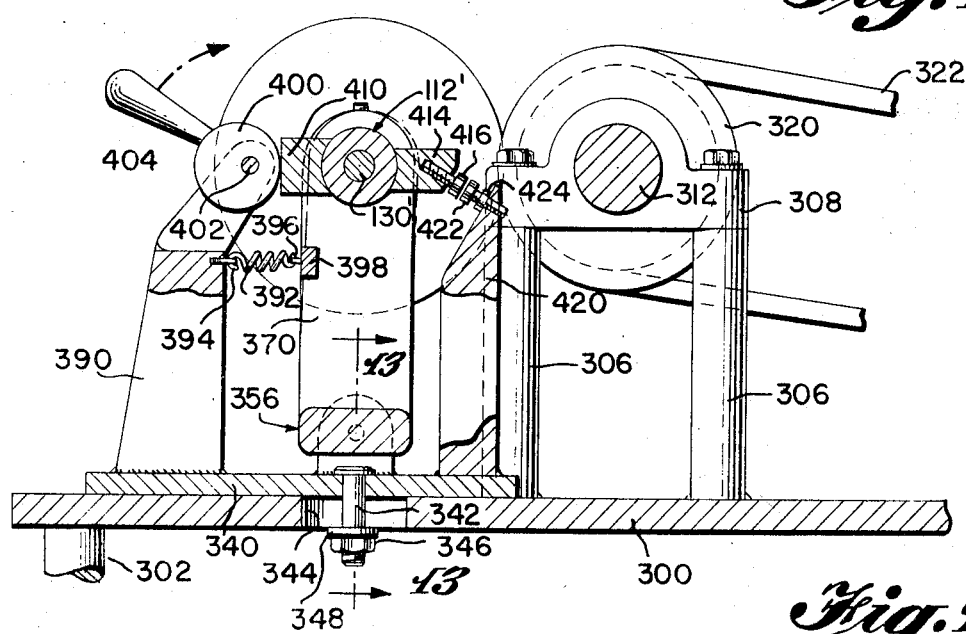
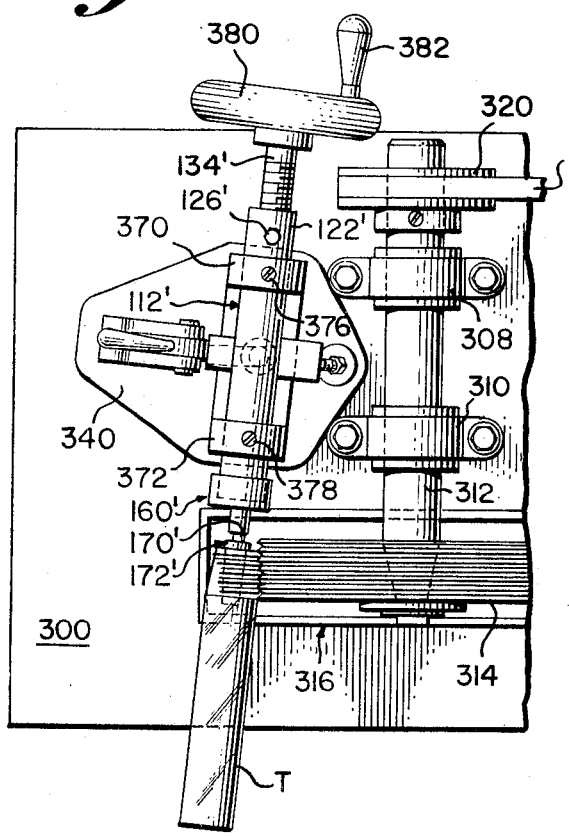
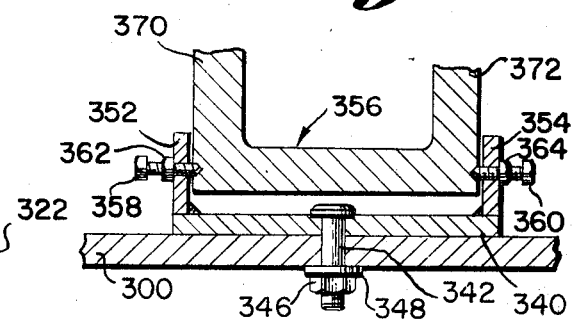
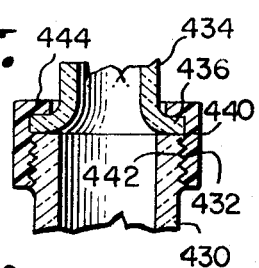
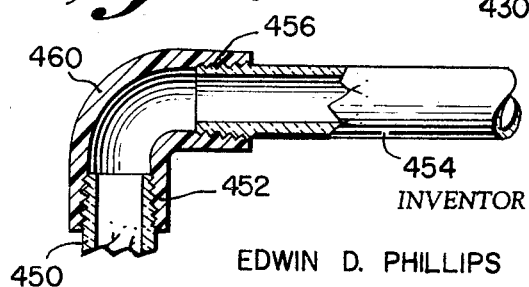
INVENTOR
EDWIN D. PHILLIPS
BY Shoemaker and Mattare
ATTORNEYS United States Patent Office 3,512,306
Patented May 19, 1970

3,512,306
GLASS THREADING APPARATUS
Edwin D. Phillips, 170 Albert St.,
North Plainfield, N.J. 07060
Filed July 18, 1967, Ser. No. 654,210
Int. Cl. B24b 3/00
U.S. Cl. 51—95        19 Claims

ABSTRACT OF THE DISCLOSURE

A continuously rotating grinding wheel is provided. The workpiece is supported at the end of a shaft which can be rotated and advanced relative to said grinding wheel. This shaft is mounted in a support mechanism which is pivotally supported about two mutually perpendicular axes so that the orientation of the shaft can be adjusted relative to the grinding wheel.

The workpiece is supported on a wooden bushing mounted on a reduced tapered spindle portion at the end of the shaft.

BACKGROUND OF THE INVENTION

The present invention relates to apparatus for forming threads on the external surfaces of objects such as containers and tubing made of glass.

It is highly advantageous to employ external threads on glass containers or tubing since it eliminates the necessity of providing gaskets, metal fittings and the like, and the threaded glass item can be threaded directly into an internally threaded fitting of Teflon, nylon or hard rubber and similar substances.

The most commonly used materials for elbows, nipples and like fittings employed with glass are Teflon and nylon, and the sharp threads formed with the apparatus of the present invention enable the glass articles to be readily threadedly connected with such fittings.

The slightly roughened ground surface of the freshly threaded areas on the glass help grip the associated substance such as Teflon to thereby provide a very effective union.

In the prior art, glass articles are not provided with sharp threads by machining the article, but rather the threads when employed are molded onto the surface of the article. These threads which are molded on glass articles are of generally semi-circular cross-sectional configuration and do not provide fine sharp threads as are obtainable by grinding with he apparatus of the present invention.

SUMMARY OF THE INVENTION

The apparatus of the present invention enables glass articles to be ground in such a manner as to provide fine sharp threads thereon so as to enable the article to be readily employed with fittings having similar threads formed thereon to provide a good connection therewith.

The apparatus of the present invention provides an adjustable support mechanism so that the workpiece may be readily ground with grinding wheels of different outer diameters. Accordingly, a cast iron grinding wheel can feasibly be employed with the present invention since the grinding wheel of this type can be re-surfaced after the thread cutting edges are worn down. The adjustability of the support mechanism of the apparatus enables the workpiece to be readily employed with the re-surface grinding wheel of less diameter thereby providing a much more economical procedure in that a cast iron grinding wheel is considerably cheaper than a diamond coated wheel.

The adjustability of the support mechanism additionally enables the apparatus to be readily employed for cutting threads on workpieces of widely different outer diameters.

The thread pitch formed on the workpiece can be varied by changing the removably mounted jack screw portion and jack nut portion of the apparatus.

Additionally, the support mechanism enables the support shaft of the present invention to be varied in its orientation with respect to the grinding wheel so as to obtain various tapered threads on the workpiece.

The construction of the present invention enables almost any desired configuration of thread profile to be produced by varying the grinding wheel profile as well as the feed rate of the work supporting shaft.

The apparatus of the present invention also employs an arrangement whereby movement of the work supporting shaft is automatically controlled by a switch means so that the threads formed on the outer surface of the workpiece will be of uniform depth therearound thereby avoiding chipped threads and obtaining a uniform product of high quality.

The apparatus is additionally quite simple and inexpensive in construction so that it may be easily manufactured and maintained.

BRIEF DESCRIPTION OF THE DRAWINGS

FIG. 3 is an end view of the structure shown in FIG. 1;

FIG. 4 is a sectional view on an enlarged scale taken substantially along line 4—4 of FIG. 1 looking in the direction of the arrows;

FIG. 5 is a sectional view on an enlarged scale taken substantially along line 5—5 of FIG. 3 showing the apparatus in one operative position;

FIG. 6 is a view similar to FIG. 5 illustrating the apparatus in a second operative position;

FIG. 7 is a top perspective exploded view on an enlarged scale illustrating the spindle end of the shaft in the manner in which a workpiece is assembled thereon;

FIG. 8 is a sectional view on an enlarged scale taken substantially along line 8—8 of FIG. 1 looking in the direction of the arrows;

FIG. 9 is a sectional view taken substantially along line 9—9 of FIG. 8 looking in the direction of the arrows;

FIG. 12 is a sectional view on an enlarged scale taken substantially along line 12—12 of FIG. 11 looking in the direction of the arrows;

FIG. 13 is a sectional view taken substantially along line 13—13 of FIG. 12 looking in the direction of the arrows;

FIG. 14 is a view similar to FIG. 11 illustrating a portion of the apparatus thereof in a different operative position;

FIG. 15 is a sectional view through a connection between two pieces of glass, one of which has been threaded according to the present invention; and FIG. 16 illustrates a pair of pieces of glass tubing interconnected with an elbow member of different material.

DESCRIPTION OF THE PREFERRED EMBODIMENTS

Figure 1:
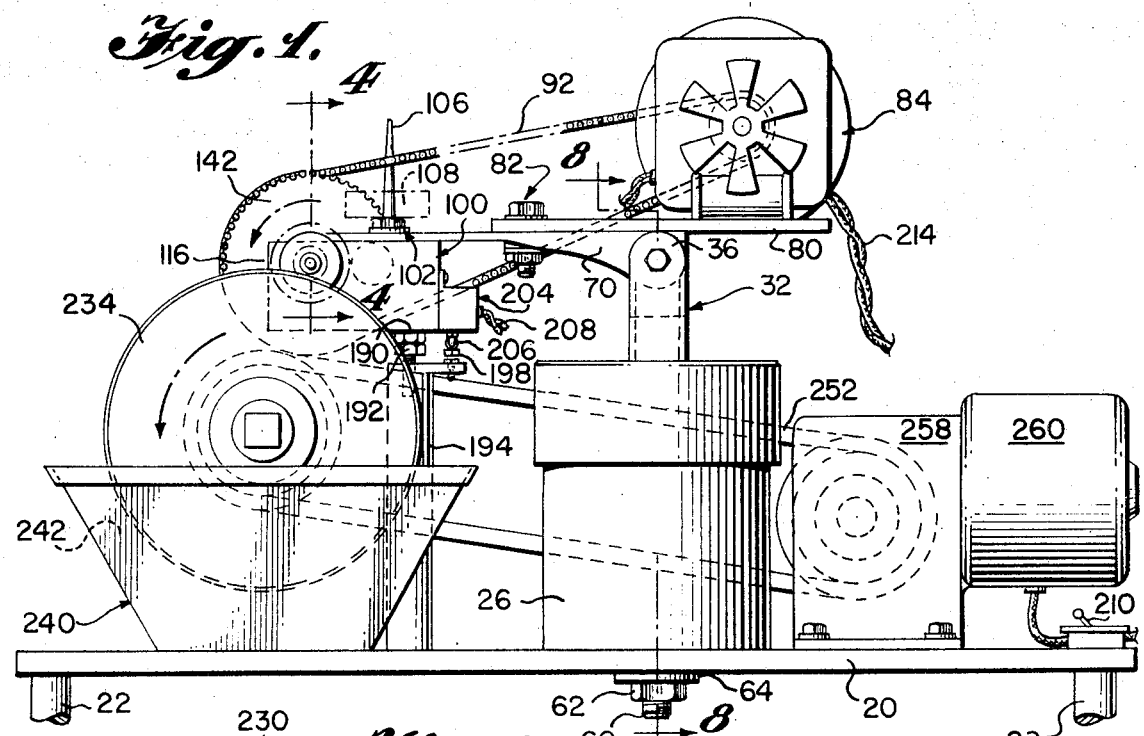
FIG. 1 is a side view of a first form of the apparatus according to the present invention.

Referring now to the drawings wherein like reference characters designate corresponding parts throughout the several views, a first form of the invention is illustrated in FIGS. 1–9 inclusive. A base plate 20 is supported at a suitable elevation by a plurality of legs 22 which extend downwardly from the undersurface thereof and are supported on any suitable surface.

As seen most clearly in FIGS. 8 and 9, a support post 26 is generally cylindrical in configuration and has a cylindrical bore 28 formed therethrough. This post is secured as by welding or the like to the upper surface of base plate 20. The support post 26 is provided with a dished recess 30 in the upper surface thereof defining a portion of a spherical surface for a purpose hereinafter described.

A generally U-shaped mounting bracket is indicated generally by reference numeral 32, this mounting bracket as seen in FIG. 8 having a curvature corresponding to the curvature of the recess 30 formed in support post 26 so that the mounting bracket can be moved in the directions indicated by the arrow as shown in FIG. 8 to vary the position of the mounting bracket with respect to the support post. The mounting bracket includes opposite end portions 34 and 36. As seen in FIG. 9, the mounting bracket includes laterally extending rounded flange portions 38 and 40 at the lower portion thereof, these flange portions extending throughout the length of each side of the mounting bracket.

In order to retain the mounting bracket in operative position wherein it is clamped against the surface 30 of the support post 26, a hold-down mechanism indicated generally by reference numeral 44 is provided. This hold-down mechanism includes an enlarged upper end portion 46 having a cavity 48 extending through the length thereof and opening at opposite ends thereof and also opening in an upward direction, the cavity being of such a configuration as to define inwardly extending opposed clamping portions 50 and 52.

The mounting bracket fits within the upper end portion 46 of the hold-down mechanism 44 as seen in FIG. 9, and as will be apparent from FIG. 8, the opposite end portions of the inwardly projecting portions 50 and 52 will engage the flanges 38 and 40 respectively on opposite sides of the mounting bracket at two spaced points to hold the mounting bracket down in the operative position shown in these figures.

The hold-down mechanism also includes a depending rod-like portion 56 which is fixedly secured to the enlarged head portion 46 as by welding or the like and which extends through a hole 58 provided in base plate 20. The lower end of portion 56 is threaded as indicated by reference numeral 60 and has threaded thereon a nut 62 in engagement with a washer 64. It is apparent that by threading the nut 62 onto the threaded end 60, the hold-down mechanism may be drawn downwardly to clamp the U-shaped mounting bracket in operative position.

Referring particularly to FIG. 8, a support plate 70 is pivotally interconnected with U-shaped bracket 32 by means of a pair of pivot screws 72 and 74 which are threaded through suitable threaded holes provided in the opposite ends 34 and 36 respectively of the mounting bracket, the sharp inner ends of these pivot screws being fitted within correspondingly shaped recesses formed in opposite sides of the support plate. Lock nuts 76 and 78 are threaded on screws 72 and 74 respectively for locking the screws in operative position as illustrated.

It is accordingly apparent that the support plate 70 is mounted for movement about a first axis defined by the pivot screws 72 and 74 and about a second axis defined by the elongated hold-down mechanism 44, these two axes being substantially mutually perpendicular to one another.

A mounting plate 80 is secured to the upper surface of support plate 70 by a pair of nut and bolt assemblies indicated by reference numeral 82, these nut and bolt assemblies extending through suitable aligned holes provided in plates 70 and 80. A suitable power-driven drive mechanism, such as an electric motor indicated generally by reference numeral 84, is supported on the mounting plate 80. Drive mechanism 84 is connected through conventional reduction gearing means indicated by reference numeral 86 and a one-way clutch mechanism 88 of conventional construction to a driven sprocket 90 which in turn is operatively connected with a driving belt 92 connected with a further driven sprocket as hereinafter described.

A bushing sleeve support portion in the form of a block of material is indicated generally by reference numeral 100, this support portion being connected with support plate 70 by means of a screw 102 which extends down through a slot 103 formed through the support plate, the screw being threaded into a correspondingly threaded hole provided in the bushing sleeve support portion. The provision of the screw and slot arrangement enables the support portion 100 to be adjusted with respect to the support plate 70 so that the position of the workpiece with respect to the grinding wheel hereinafter described may be readily adjusted.

The head of screw 102 bears against a washer 104, and an elongated pin 106 extends upwardly from and is integral with the head of the screw. This upwardly extending pin is adapted to receive one or more counter-weights 108 which are provided with suitable holes therethrough for reception of the pin 106. These counterweights are provided for the purpose of applying a suitable degree of downward bias on the work support means so that the work support means will be urged against the grinding wheel hereinafter described. Any suitable amount of weight may be applied about pin 106.

As seen most clearly in FIG. 4, the bushing sleeve support portion 100 has a bore 110 formed therethrough which snugly receives a bushing sleeve indicated generally by reference numeral 112. This bushing sleeve has a substantially cylindrical bore 114 extending therethrough. As seen most clearly in FIG. 5, the bushing sleeve is held in place within the associated support portion by means of a set screw 116 which is threaded within a correspondingly threaded bore provided in the bushing sleeve support portion, the inner end of the set screw engaging the bushing sleeve to hold it in place.

Referring again to FIG. 4, the busing sleeve 112 is provided with a clearance means 120 in the form of a peripherally extending recess formed at one end thereof and which represents an enlarged portion of the bore 114 formed therethrough for receiving part of a jack screw hereinafter described. The surrounding portion of the bushing sleeve is of reduced outer dimension and receives an end of a jack nut 122 having internal threads 124 formed therein and opening to the left as seen in FIG .4 for receiving a jack screw. The jack nut 122 is removably mounted on the bushing sleeve by a pair of diametrically oppositely disposed screws members 126 which are threaded inwardly through suitable threaded holes provided in the jack nut and extend into suitable recesses provided in the adjacent portions of the bushing sleeve. This arrangement enables the jack nut to be readily replaced when desired so as to provide threads of a different pitch, for example.

A shaft 130 is rotatably supported within the bore 114 of the bushing sleeve, the shaft including a reduced end portion 132 upon which is mounted a jack screw 134 in surrounding relationship thereto. This jack screw has external threads 136 formed thereon which are adapted to be threaded within the threads 124 of the jack nut previously described so that upon relative rotation of the jack screw with respect to the jack nut, the jack screw and the shaft interconnected therewith will be advanced to the right as seen in FIG. 4.

One end of the jack screw 134 is seated against a shoulder 140 formed between the main portion of the shaft 130 and the reduced end portion 132 thereof. The opposite end of the jack screw is in abutting relationship with a driven sprocket 142 which is drivingly engaged by the driving belt 92 previously described, whereby shaft 130 is driven by the electric motor 84.

The driven sprocket 142 has a central bore 144 formed therethrough which snugly receives the shaft 130. The sprocket 142 is retained on the shaft 130 by means of a nut 148 which is threaded on the threaded end 150 of the reduced portion 132 of the shaft. This interconnection serves to drivingly connect sprocket 142 with the shaft, and at the same time permits the sprocket and the jack screw 134 to be readily removed and replaced if it is desired to change either of these members. A manually graspable handle 154 is secured to the driven sprocket 142 for rotating the driven sprocket in a direction opposite to that in which the sprocket is driven by the motor 84, for a purpose hereinafter described.

The shaft 130 includes an integral skirt indicated generally by reference numeral 160 and comprising a radially outwardly extending disc-like portion 162 which joins with a generally cylindrical portion 164 within which the bushing sleeve 112 fits snugly, the skirt being adapted to rotate with respect to the bushing sleeve and serving to prevent grinding compounds from entering the bore within the bushing sleeve during operation of the apparatus.

The right-hand end of the shaft as seen in FIGS. 4 and 7 terminates in a reduced spindle portion 170 having a tapered outer surface. A bushing indicated generally by reference numeral 172 is provided with a tapered bore 174 formed therethrough whereby the bushing is adapted to be snugly received on the reduced spindle portion and held in place thereon. The bushing is preferably formed of wood since it has been found that wood is an ideal substance for this purpose. The wooden bushing will readily cling to the reduced spindle portion and has been found to properly support glass articles thereon. The bushing includes an enlarged end portion 176.

This bushing is adapted to receive and support a glass workpiece thereon. In the illustrated example, a septum flask is disclosed including a neck portion 180 having an enlarged end portion 182 upon which it is desired to form threads by a machine. In FIG. 7, the end of the flask is illustrated prior to forming threads thereon, and in FIG. 4, the end of the flask is illustrated in operative position on the bushing which in turn is supported on the spindle portion at the end of the shaft, the end portion 182 of the flask having threads formed thereon as illustrated in this figure. It will of course be understood that any suitable workpiece can be supported on the bushing, the bushing also having a tapered outer surface so that it is adapted to be wedged within the open end of a container, or tubing and the like.

As seen most clearly in FIGS. 5 and 6, a screw 190 is threaded within a suitable threaded bore opening through the lower surface of the bushing sleeve support portion 100. A similar screw 192 is threaded within a suitable threaded bore provided within a post 194 which is supported on the upper surface of the base plate 20. Either one or both of these screws 190 and 192 may be adjusted with respect to one another so as to limit downward swinging movement of the support plate 70 and the various components associated therewith as hereinbefore described. This adjustment enables the root depth of the threads produced on the workpiece to be adjusted.

A lateral extension 196 is formed at the upper end of post 194, and a screw 198 is threaded through a suitable threaded bore provided in this portion 196. A lock nut 200 is threaded onto screw 198 to hold it in adjusted position.

A microswitch indicated by reference numeral 204 is secured by screws 205 to the bushing sleeve support portion 100. This microswitch includes a depending portion 206 which is adapted to engage the screw 198. The microswitch is normally open and is closed when it is in the position shown in FIG. 5 wherein the screw 198 forces the contact 206 upwardly within the body of the microswitch. Electrical lead means 208 extends from the microswitch for connection in a suitable electric circuit.

Figure 2:
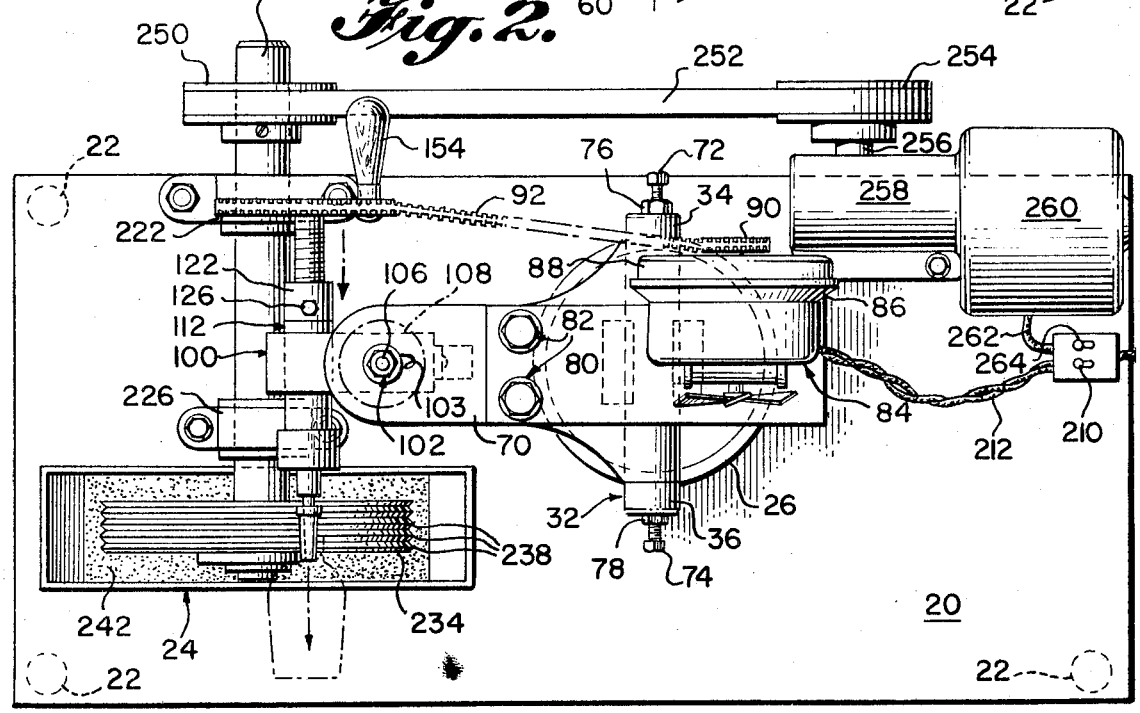
FIG. 2 is a top view of the structure shown in FIG. 1.
Figure 10:
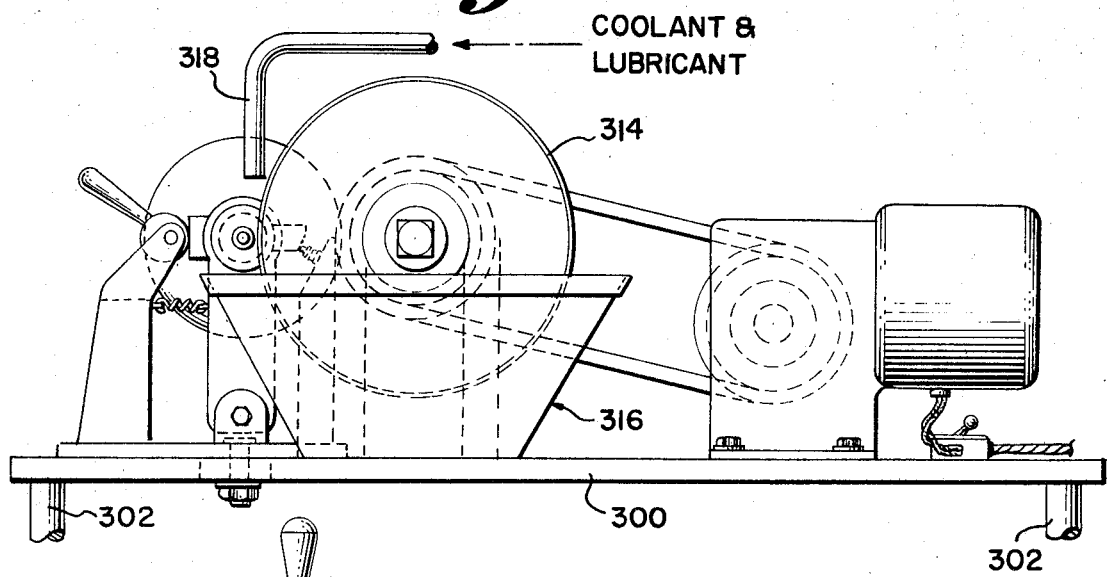
FIG. 10 is a side view of a modified form of apparatus according to the present invention.

As seen in FIG. 2, a switch 210 is connected with electrical lead means 212, and electrical lead means 214 as seen in FIG. 1 is connected with the motor 84. These lead means are connected such that the circuit extends from one side of a source of electrical energy through the switch 210, thence to the microswitch 204, and then through the motor 84 and back to the other side of the source of electrical energy. With this arrangement, it is necessary for both switch 210 and microswitch 204 to be closed to energize the circuit through the motor 84 to rotate the shaft 130 and the associated jack screw 134 to advance the shaft 130 with respect to the bushing sleeve and the associated jack nut 122.

As seen most clearly in FIG. 3, the first pair of spaced supports 220 (only one of which is visible) supports a bearing 222, while a second pair of similar supports 224 (only one if which is shown) supports a bearing 226. These supports 220 and 224 extend upwardly from the upper surface of the base plate 20. A drive shaft 230 for the grinding whel is rotatably supported within the bearings 222 and 226.

The right-hand end of this driving shaft 230 is tapered as indicated by reference numeral 232 and receives a grinding wheel 234 which has a tapered central hole fitting on the tapered surface of the drive shaft 230 to enable quick change of the grinding wheel and absolute centering thereof. The drive shaft is provided with an internal threaded bore formed therein which receives a clamping screw 236 for holding the grinding wheel in place on the shaft.

This grinding wheel may of course be of any desired construction, and as mentioned previously, is preferably of cast iron in the present invention and is provided with a grooved outer surface 238 for forming threads in the surface of a glass article. The outer surface of the grinding wheel can be re-grooved from time to time thereby enabling it to be used over a considerable period of time.

The grinding wheel runs within an open-topped container 240 having a suitable grinding compound 242 disposed therewithin. This grinding compound may for example comprise a mixture of aluminum oxide, water and a silica gel vehicle. The outer grooved surface of the grinding wheel is provided with a suitable abrasive material such as Carborundum or the like, and the grinding compound serves to lubricate and cool the grinding wheel as it rotates through the body of the compound within the container 240.

As seen most clearly in FIG. 2, a pulley 250 is secured to the driven shaft 230, pulley 250 being interconnected by a belt 252 with a pulley 254. Pulley 254 is connected with a shaft 256 extending from a gear box 258 driven by an electric motor 260. This motor is connected by electric lead means 262 with a switch 264. When switch 264 is actuated into the position shown, motor 260 is driven continuously so as to drive the grinding wheel 234 continuously during operation of the apparatus.

When both of the switches 264 and 210 are moved into the position shown in FIG. 2, and a workpiece is mounted on the shaft 130, the support plate 70 may be lowered into the operative position shown in FIGS. 1–5 inclusive. In this position, interengagement of the screws 190 and 192 as seen in FIG. 5 will determine the root depth of the threads produced on the associated workpiece, and the microswitch 204 is closed so that motor 84 is energized to cause rotation of shaft 130 whereby interengagement of the jack screw and the jack nut will cause the shaft 130 to move to the right as seen for example in FIG. 4.

Referring again to FIG. 6 of the drawings, if material from the workpiece as indicated by reference character M should build up between the grinding wheel and the workpiece so that the threads would not be properly formed on the workpiece, the support plate 70 and the associated components will be moved into the position shown in this figure. This will open the microswitch 204, and shaft 130 will cease to rotate until the components again return to the position shown in FIG. 5. This assures that the threads will be properly formed completely around the workpiece and that there will be no chipping of the threads.

It should be noted that the glass workpiece can be started anywhere on the thickness of the grinding wheel and that one complete rotation of shaft 130 will form the completed threads on the outer surface of the workpiece.

Due to the adjustabilty of the apparatus, the machine can easily cut threads on workpieces of different diameter, and different size bushings can be employed for supporting different size workpieces in position.

The thread pitch on the articles can be varied by substituting different jack screws and jack nuts on the apparatus which are readily interchangeable. Additionally, a tapered thread can readily be formed by adjusting the position of the U-shaped mounting bracket 32 with respect to the post 26.

As mentioned previously, the drive motor 84 drives through a one-way clutch mechanism to rotate shaft 130 in a direction to advance the workpiece with respect to the grinding wheel. After the threads have been formed on the workpiece, the drive motor 84 as well as the motor 260 may be de-energized. The jack screw can then be backed off with respect to the jack nut to move the shaft 130 in the opposite direction by manually grasping the handle portion 154 and rotating the sprocket 142 in the opposite direction. This movement is of course readily permitted by the one-way clutch mechanism. The grinding operation may then be subsequently carried out with another workpiece.

Referring now to FIGS. 10–14 inclusive, a modified form of the invention is illustrated. In this form of the invention, a base plate 300 is supported by a plurality of support members 302 above a suitable underlying support surface.

A first pair of upwardly extending support members 306 have a bearing 308 secured to the upper ends thereof, and a similar bearing 310 is mounted in a like manner above the base plate. These bearings serve to rotatably support a drive shaft 312 to which a grinding wheel 314 is secured. The shaft and grinding wheel may be of similar construction to those previously described. In this case, the grinding wheel may be provided with a diamond coating on the outer surface thereof. The grinding wheel is adapted to run within a container 316 in a manner of the aforedescribed embodiment, and a conduit means 318 is provided for a coolant and lubricant substance which is dispensed from the lower end thereof onto the outer surface of the grinding wheel.

A pulley 320 is fixed to the shaft 312 and is connected by a driving belt 322 with a pulley 324. This latter pulley is connected with a shaft 326 which in turn is connected with a reducing gear mechanism 328 which is driven by an electric motor 330. This electric motor is controlled by a switch 332 so that the motor can be continuously driven to continuously drive the grinding wheel during operation of the apparatus.

A plate 340 as seen most clearly in FIGS. 12 and 13 is supported on the upper surface of base plate 300 and is provided with a central hole which receives a bolt 342 extending downwardly through a slot 344 formed in base plate 300. A nut 346 is threaded on the lower threaded end of bolt 342 and bears against a washer 348. This nut and bolt connection between plate 340 and the base plate 300 enables the plate 340 to be readily adjusted so that the components supported thereby may be adjusted into various operative positions about the axis of bolt 342.

As seen most clearly in FIG. 13, a pair of upstanding bracket members 352 and 354 are connected with the upper surface of plate 340. A generally U-shaped yoke 356 is pivotally supported by these brackets through the intermediary of pivot pins 358 and 360. These pivot pins extend through suitable threaded holes provided in the bracket members and into recesses formed in opposite sides of the yoke 356. Lock nuts 362 and 364 are threaded on the pins 358 and 360 respectively for holding them in adjusted position.

The yoke member 356 includes upwardly extending legs 370 and 372, the upper ends of these legs being provided with suitable holes for receiving a bushing sleeve 112' which is of substantially the same construction as the bushing sleeve previously described. This bushing sleeve is held in place by a pair of set screws 376 and 378 which extend through threaded holes provided in the upper ends of legs 370 and 372 respectively and engage against the outer surface of the bushing sleeve.

Various components of this form of the invention which are substantially identical with those previously described have been given the same reference numerals primed. It will be noted that a jack nut 122' is removably supported on the bushing sleeve 112', and a jack screw portion 134' is supported on the shaft thereof which is substantially identical to the shaft 130 previously described. Instead of securing a driven sprocket such as sprocket 142 to one end of the shaft, this form of the invention has a hand wheel 380 scured to the corresponding end of the shaft, a handle 382 extending therefrom whereby turning of the shaft in this form of the invention is performed completely by hand in both directions of rotation in contrast to the aforedescribed embodiment wherein the shaft is driven in one direction by a power-operated means and is manually driven in the opposite direction.

The shaft 130' in this latter form of the invention is provided with an integral skirt portion 160', and a reduced spindle portion 170' which receives a bushing 172' preferably formed of wood.

Figure 11:
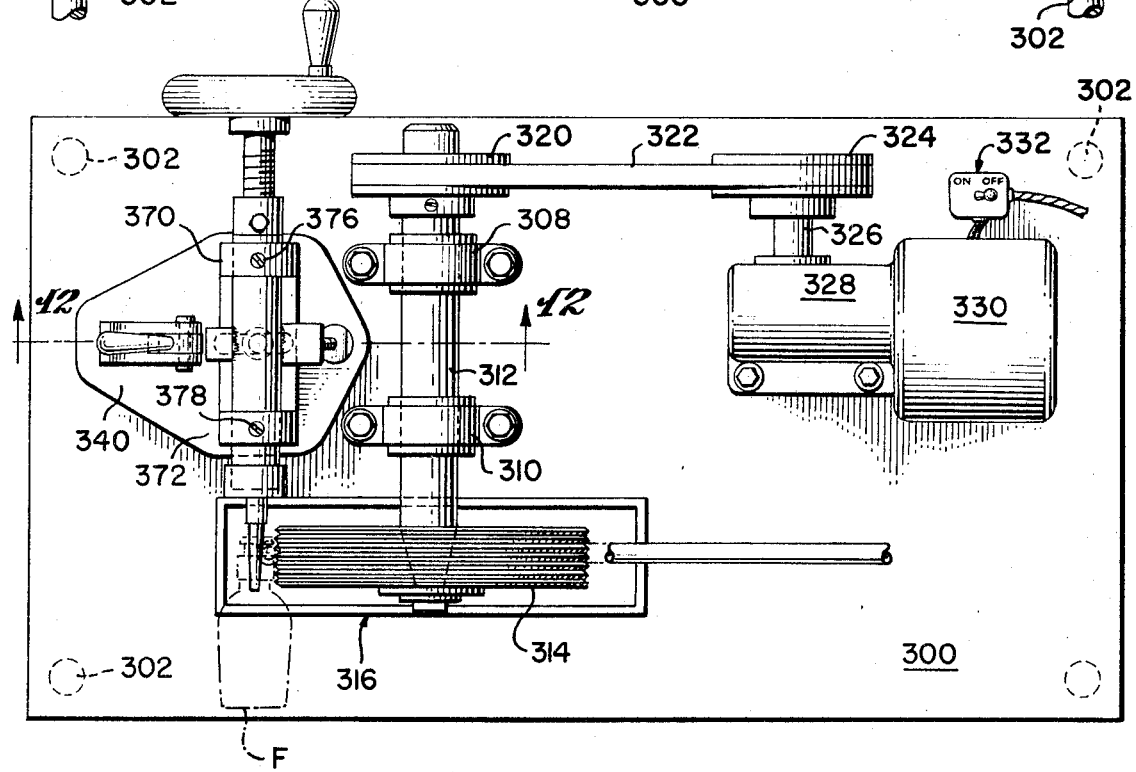
FIG. 11 is a top view of the structure shown in FIG. 10.

In FIG. 11 of the drawings, a flask indicated by reference character F is illustrated as mounted in operative position on the apparatus, while in FIG. 14, a piece of tubing indicated by reference character T is mounted on the apparatus. In FIG. 14, the plate 340 has been adjusted so as to form tapered threads on the piece of tubing T.

As seen most clearly in FIG. 12, a support member 390 is secured to the upper surface of plate 340 and extends upwardly therefrom. A tension spring 392 has the opposite ends thereof connected with a hook member 394 secured to support member 390 and a hook member 396 secured to a member 398 extending between the leg portions 370 and 372 of the U-shaped pivoted yoke 356. This spring normally biases the pivoted yoke in a counterclockwise direction as seen in FIG. 12.

A disc-like member 400 is mounted about an eccentric pivot shaft 402 and is operatively connected with a hand-operated handle portion 404. A member 410 secured to the bushing sleeve 112' bears against the outer periphery of member 400, and it is apparent that by swinging the handle portion 404 in the direction of the arrow as shown in FIG. 12, the pivoted yoke can be swung in a clockwise direction against the force of spring 392.

A member 414 extends from the bushing sleeve 112' at a point diametrically opposite from member 410. A screw 416 is threadedly received within a correspondingly threaded bore formed in member 414.

An upstanding member 420 is secured to the upper surface of plate 340, and a screw 422 is threaded through a correspondingly threaded bore provided in member 420. A lock nut 424 is threaded on the screw 422. It is apparent that by adjusting the positions of screws 416 and 422, a limit stop means is provided for limiting the pivotal movement of the pivoted yoke 356. This limit stop means serves to determine the root depth of the threads produced on the workpiece.

It is apparent that in the modification illustrated in FIGS. 10–14 inclusive, the apparatus is adapted to perform the same functions as in the previously described modification, and the same advantages ensue from the use of the apparatus illustrated in this latter embodiment.

Referring now to FIG. 15, a connection between two glass members is illustrated. A piece of tubing 430 which is formed of glass is provided with threads 432 on the outer surface thereof by utilizing the apparatus of the present invention.

A further tubular member 434 formed of glass is provided with a flared end 436 adapted to butt against the open end of tubing 430.

A connector 440 preferably formed of Teflon or similar substance is provided with internal threads 442 which are adapted to be threaded on the external threads 432 provided on glass tubing 430, and a flange portion 444 of member 440 is adapted to pull the flared end of the tubular member 434 snugly against tubing 430 to provide the desired connection therebetween.

Referring now to FIG. 16, a further connection according to the present invention is illustrated. A piece of tubing 450 formed of glass is provided with external threads 452 on one end thereof, and a further piece of tubing 454 of glass is provided with threads 456 at one end thereof, the threads in each case being formed with the apparatus of the present invention.

An elbow member 460 formed of Teflon or the like has internal threads formed in the opposite open ends thereof which are adapted to receive the threaded ends of the tubing 450 and 454 to provide the desired connection.

It is apparent from the foregoing that there is provided according to the present invention new and novel glass threading apparatus whereby threads can be efficiently and accurately ground on the outer surface of workpieces formed of glass. Various size workpieces may be effectively employed with the present invention, and the thread pitch as well as the taper of the thread can be readily adjusted. In the first-mentioned modification, chipped threads are automatically eliminated by means of the microswitch control means, and in the latter modification, this may be controlled manually through the intermediary of the handle 404 as well as the rate at which the hand wheel 380 is turned.

As this invention may be embodied in several forms without departing from the spirit or essential characteristics thereof, the present embodiments are therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What I claim is:
1. Glass threading apparatus comprising means for forming threads on glass objects, including:
 a grinding wheel having thread forming means on its periphery;
 means to rotate the grinding wheel during operation of the apparatus;
 work support means comprising an elongated axially movable rotatably mounted shaft having a spindle portion for supporting a glass workpiece thereon and means for moving said shaft axially in timed relation to its rotation;
 supporting mechanism for supporting said shaft, said support mechanism being mounted for bodily movement about a first axis and for swinging movement about a second axis at one end, said first and second axes being perpendicular to one another, the other end of said support mechanism having means carrying said work support means;
 and adjustable means limiting said swinging movement of said support mechanism in one direction and adjusting the movement of said shaft toward said grinding wheel.
2. Apparatus as defined in claim 1 wherein said work support means includes a bushing sleeve having a bore formed therethrough receiving said shaft, said shaft having a jack screw portion thereon, means for turning said shaft and said jack screw portion, a jack nut portion being supported by said bushing sleeve and receiving said jack screw portion for advancing said shaft along the longitudinal axis thereof.
3. Apparatus as defined in claim 2 wherein the jack screw portion on said shaft is removably mounted thereon, and the jack nut portion on said bushing sleeve is removably mounted thereon.
4. Apparatus as defined in claim 2 wherein said bushing sleeve includes clearance means for receiving a portion of said jack screw portion.
5. Apparatus as defined in claim 2 wherein said shaft has a skirt formed thereon and adapted to fit about a portion of said bushing sleeve.
6. Apparatus as defined in claim 1 wherein said support mechanism includes a bushing sleeve support portion, a bushing sleeve supported by said bushing sleeve support portion, said bushing sleeve having a bore formed therethrough receiving said shaft and permitting rotation of said shaft with respect to said bushing sleeve, said bushing sleeve support portion being pivotally mounted about a first axis of rotation for adjusting the orientation of said shaft relative to said grinding wheel.
7. Apparatus as defined in claim 6 wherein said bushing sleeve support portion is also pivotally mounted about a second axis of rotation which extends substantially perpendicular to said first axis of rotation.
8. Apparatus as defined in claim 6 including limit stop means for limiting the pivotal movement of said bushing sleeve support portion about said first axis of rotation.
9. Appaartus as defined in claim 1 wherein said spindle portion of the shaft is of reduced outer dimension and is provided with a tapered outer surface.
10. Apparatus as defined in claim 9 including a mounting bushing disposed on said spindle portion of the shaft.
11. Apparatus as defined in claim 10 wherein said bushing is formed of wood.
12. Apparatus as defined in claim 1 wherein said spindle portion of the shaft is of reduced outer dimension and includes a tapered outer surface, a bushing fitted on said spindle portion, said bushing having a tapered outer surface, the bushing being formed of wood, a jack screw portion being supported on said shaft and being removably mounted thereon, and means for turning said shaft and the associated screw portion.
13. Apparatus as defined in claim 12 including a bushing sleeve having a bore formed therethrough which receives said shaft and supports said shaft for rotation therewithin, a jack nut portion supported by said bushing sleeve and receiving said jack screw portion, said jack nut portion being removably mounted on said bushing sleeve, said shaft having a skirt thereon which fits about a portion of said bushing sleeve.
14. Apparatus as defined in claim 13 wherein said support mechanism includes a bushing sleeve support portion, said bushing sleeve being mounted within said bushing sleeve support portion, said bushing sleeve support portion being pivotally mounted about a first axis of rotation and also being pivotally mounted about a second axis of rotation which is disposed substantially perpendicular to said first axis of rotation, and means for limiting pivotal movement of said support mechanism about said first axis of rotation.
15. Apparatus as defined in claim 1 wherein said means for turning said shaft comprises power-operated means, said power-operated means being connected with said shaft through a one-way clutch mechanism, auxiliary manually operated means for turning the shaft so as to move the shaft in a direction opposite to that in which it is moved by said power-operated means.
16. Apparatus as defined in claim 15 including switch means for controlling the operation of said power-oper- ated drive means, said switch means being controlled by the position of said support mechanism.

17. Apparatus as defined in claim 1 wherein said support mechanism includes a pivoted yoke means, resilient means normally biasing said pivoted yoke means in the direction away from said grinding wheel.

18. Apparatus as defined in claim 17 including manually operated means for urging said pivoted yoke means toward said grinding wheel against the force of said resilient means.

19. Apparatus as defined in claim 18 wherein said last-mentioned manual means includes a pivoted lever mechanism operatively connected with an eccentric member engageable with a portion of said pivoted yoke means for pivoting said pivoted yoke means.

References Cited

UNITED STATES PATENTS

| | | |
|---|---|---|
| 498,835 | 6/1893 | Atterbury. |
| 765,304 | 7/1904 | Bishop. |
| 771,106 | 9/1904 | Wackenhoth _____ 51—95 X |
| 1,275,218 | 8/1918 | Calkins _____ 51—95 |
| 1,573,523 | 2/1926 | Richard _____ 51—95 |
| 1,660,468 | 2/1928 | Bath. |
| 2,052,567 | 9/1936 | Haines _____ 51—95 |
| 2,227,715 | 1/1941 | Horstmann _____ 51—95 |

LESTER M. SWINGLE, Primary Examiner

U.S. Cl. X.R.

51—227, 283